(12) United States Patent
Choi et al.

(10) Patent No.: US 8,670,519 B2
(45) Date of Patent: Mar. 11, 2014

(54) NUCLEAR FUEL ASSEMBLY HOLD DOWN SPRING

(75) Inventors: Joonhyung Choi, Columbia, SC (US); Yu Chung Lee, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 686 days.

(21) Appl. No.: 12/901,599

(22) Filed: Oct. 11, 2010

(65) Prior Publication Data

US 2012/0087458 A1 Apr. 12, 2012

(51) Int. Cl.
*G21C 19/28* (2006.01)

(52) U.S. Cl.
USPC .......................................................... 376/364

(58) Field of Classification Search
USPC .......................................................... 376/364
See application file for complete search history.

(56) References Cited

U.S. PATENT DOCUMENTS

| 4,938,919 | A | | 7/1990 | Rylatt | |
|---|---|---|---|---|---|
| 5,053,191 | A | * | 10/1991 | Bryan et al. | 376/446 |
| 5,271,053 | A | * | 12/1993 | Bryan | 376/364 |
| 5,276,721 | A | | 1/1994 | Beuerlein | |
| 6,154,514 | A | * | 11/2000 | Murakami et al. | 376/364 |
| 2009/0257546 | A1 | | 10/2009 | Lu et al. | |
| 2011/0182395 | A1 | * | 7/2011 | Park et al. | 376/364 |

FOREIGN PATENT DOCUMENTS

WO     WO 2009/135163 A2     11/2009

* cited by examiner

*Primary Examiner* — Timothy A Brainard
(74) *Attorney, Agent, or Firm* — Joseph C. Spadacene; Westinghouse Electric Company LLC

(57) ABSTRACT

A nuclear fuel assembly having a plurality of multi-leaf hold down spring sets extending from a top nozzle. Each spring set consists of a multiple number of springs leafs in order to provide a large working range of spring deflection. Each spring leaf has a straight, flat base section followed by a straight, flat tapered beam with a secondary spring set having a curvature at its peripheral end.

5 Claims, 8 Drawing Sheets

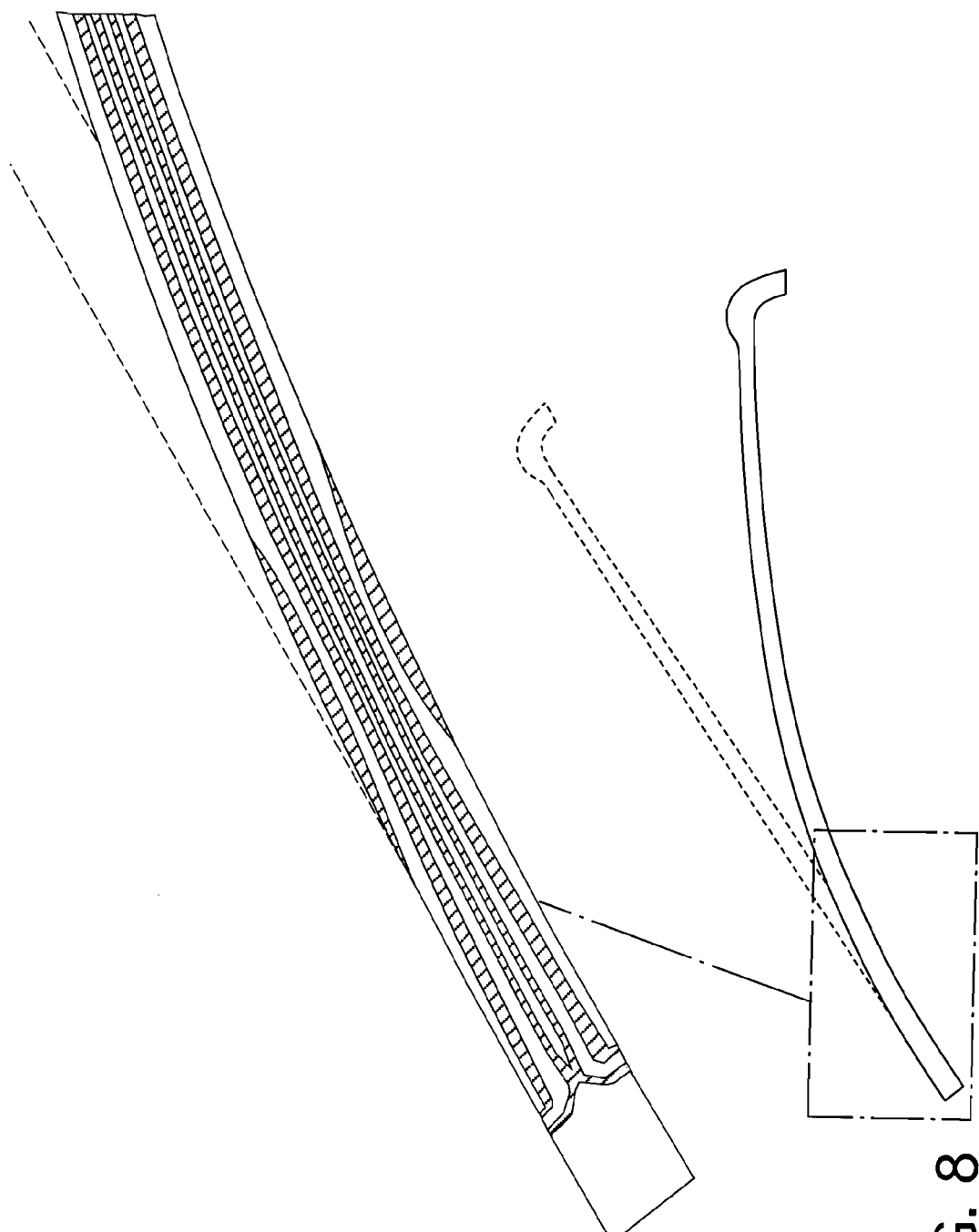

NUCLEAR FUEL ASSEMBLY HOLD DOWN SPRING

BACKGROUND OF THE INVENTION

1. Field of the Invention

This invention pertains generally to a nuclear reactor fuel assembly and more particularly to an improved hold down spring on the top nozzle of the fuel assembly.

2. Related Art

The primary side of nuclear reactor power generating systems which are cooled with water under pressure comprises a closed circuit which is isolated and in heat exchange relationship with the secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 (also shown in FIG. 2), enclosing a nuclear core 14. A liquid reactor coolant, such as water is pumped into the vessel 10 by pump 16 through the core 14 where heat energy is absorbed and is discharged to a heat exchanger 18, typically referred to as a steam generator in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structure can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plates 40.

The rectilinearly movable control rods 28 typically include a drive shaft 50 and a spider assembly 52 of neutron poison rods 28 that are guided through the upper internals 26 and into aligned fuel assemblies 22 by control rod guide tubes 54. The guide tubes are fixedly joined to the upper support assembly 46 and connected to the top of the upper core plate 40.

FIG. 3 is an elevational view, represented in vertically shortened form, of a typical fuel assembly being generally designated by reference character 22. The fuel assembly 22 is of the type used in a pressured water reactor and has a structural skeleton which, at its lower end, includes a bottom nozzle 58 sometimes referred to as the lower end fitting. The bottom nozzle 58 supports the fuel assembly 22 on a lower core support plate 60 in the core region of the nuclear reactor (the lower core support plate 60 is represented by reference character 36 in FIG. 2). In addition to the bottom nozzle 58, the structural skeleton of the fuel assembly 22 also includes a top nozzle 62 (sometimes referred to as the upper end fitting or top end fitting) at its upper end and a number of guide tubes or thimbles 54 (also referred to as guide tubes), which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 and an organized array of elongated fuel rods 66 transversely spaced and supported by the grids 64. Although it cannot be seen in FIG. 3, the grids 64 are conventionally formed from orthogonal straps that are interleaved in an eggcrate pattern with the adjacent interface of four straps defining approximately square support cells through which the fuel rods 66 are supported in a transversely spaced relationship with each other. In many conventional designs, springs and dimples are stamped into the opposing walls of the straps that form the support cells. The springs and dimples extend radially into the support cells and capture the fuel rods therebetween; exerting pressure on the fuel rods cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 78 are reciprocably movable in the guide thimbles 54 located at predetermined positions in the fuel assembly 22. Specifically, a rod cluster control mechanism 80 positioned above the top nozzle 62 supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 80, all in a well known manner.

As previously mentioned, the fuel assemblies are subject to hydraulic forces that exceed the weight of the fuel rods and thereby exert significant forces on the fuel rods and the fuel assemblies. These forces are countered by a combination of the weight of the fuel assemblies 22 and a plurality of hold down spring assemblies 56 on the top nozzles 62 which push against the upper core plate 40 (FIG. 2) of the reactor. The hold down spring assemblies 56 thereby prevent the force of the upward coolant flow from lifting the fuel assemblies into damaging contact with the upper core plate, while allowing for changes in fuel assembly length due to core-induced thermal expansion and radiation growth. Operating experience has shown that these hold down springs can be subject to stress corrosion cracking which can reduce their effectiveness.

Accordingly, a new hold down arrangement is desired that will maintain its resiliency over extended fuel cycles. Furthermore, a new hold down assembly is desired that will be more resistant to stress corrosion cracking.

SUMMARY OF THE INVENTION

These and other objects are achieved by an improved fuel assembly having a top end fitting and a bottom end fitting connected together by a structural assembly having an axial dimension that extends from the bottom end fitting to the top end fitting, with the top end fitting having a hold down spring assembly projecting above an upper surface of the top end fitting. The hold down spring has a primary spring member extending above the top end fitting, that includes a first straight leg portion having one end attached to a frame of the top end fitting at an acute angle to a plane orthogonal to the axial dimension of the fuel assembly, with the acute angle being greater than 0°. An arcuate transition portion extends at the other end of the first straight leg with a straight second leg portion extending from the transition portion toward the frame at an acute included angle with the first leg. The primary spring member is oriented on the top end fitting so that the transition portion is at the vertical highest elevation, whereby movement of the end fitting and an upper plate of the reactor that the nuclear fuel assembly is designed to operate in, relatively towards each other, primarily loads the transition portion and deflects the first leg portion about the attachment to the end fitting frame. The hold down spring assembly also includes at least one secondary spring that has a first and second end. The first end is attached to the top end fitting adjacent the first end of the primary spring first leg. The second end terminates adjacent the transition portion and includes means for interacting with the transition portion to resist downward movement of the transition portion as the primary spring member deflects in a cantilever fashion.

Preferably, the end of the primary spring that is attached to the frame of the top end fitting is supported in a slot in the frame that extends substantially at the acute angle. Desirably, the spring is clamped on a first portion of the surface on the frame that extends substantially at the acute angle where a periphery of the first portion of the surface of the frame under the primary spring is radiused to transition to a second portion of the surface of the frame under the primary spring that extends substantially parallel to the plane orthogonal to the axial dimension.

In still another embodiment, the at least one secondary spring above has a substantially flat leg that extends from the first end to an intermediate portion near the second end where the flat leg is radiused in the direction of the frame. Preferably, the radiused intermediate portion is curved at between 10° and 70°.

BRIEF DESCRIPTION OF THE DRAWINGS

A further understanding of the invention can be gained from the following description of the preferred embodiments when read in conjunction with the accompanying drawings in which:

FIG. 8 is a graphical representation of the strain distribution of the leaf spring design of this invention.

DESCRIPTION OF THE PREFERRED EMBODIMENT

Figure 3:
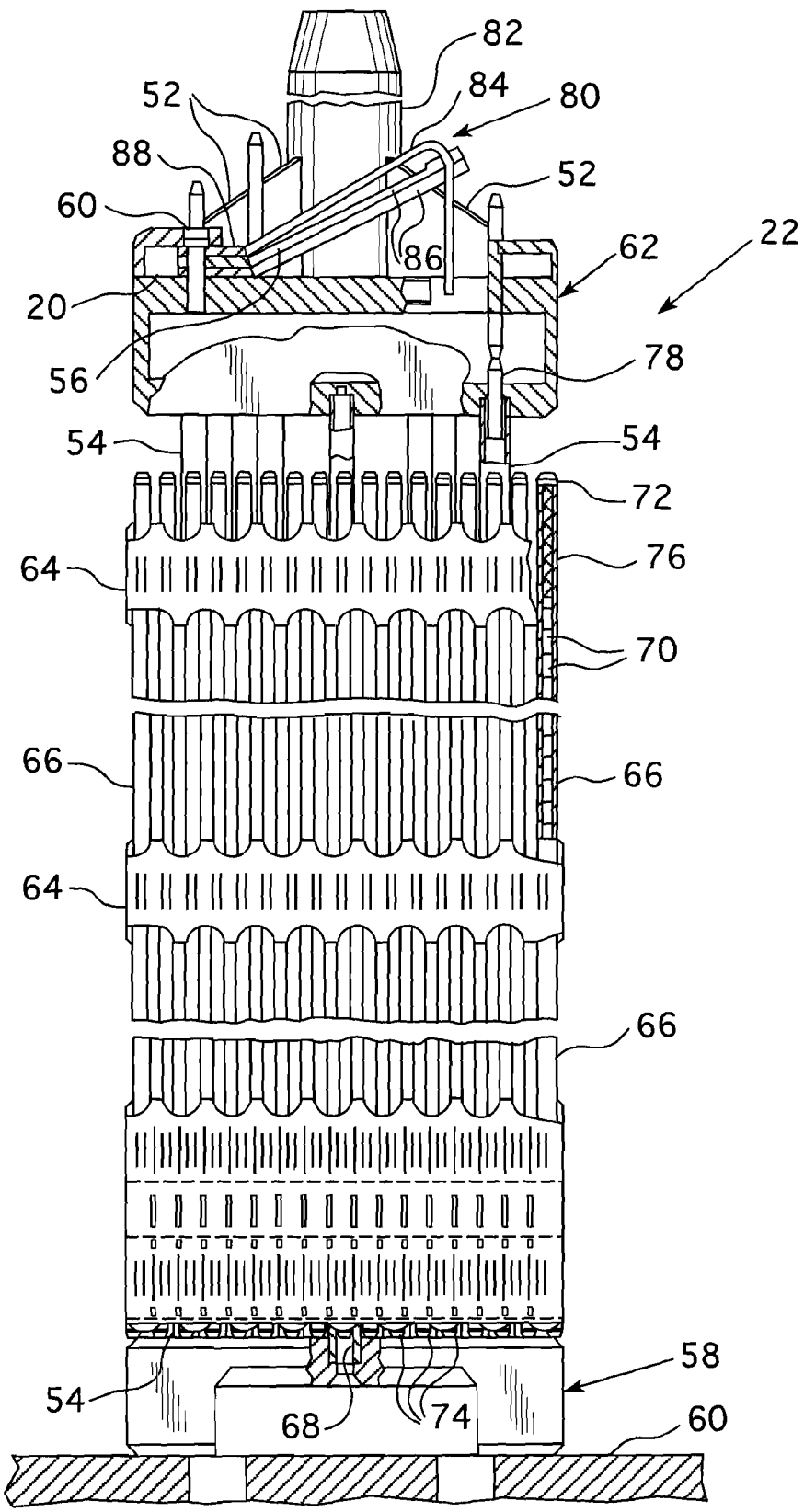
FIG. 3 is an elevational view, partially in section, of a fuel assembly illustrated in vertically shortened form, with parts broken away for clarity.

As previously indicated, the hold down spring assemblies 56 shown in FIG. 3 are important structural members for a nuclear fuel assembly. Several leafs are assembled together to form a spring set in order to provide the needed hold down force to the fuel assembly to counteract the upward lift forces due to the hydraulic flow and to permit fuel assembly growth due to differential thermal expansion and irradiation dosage during normal plant operation.

Figure 4:
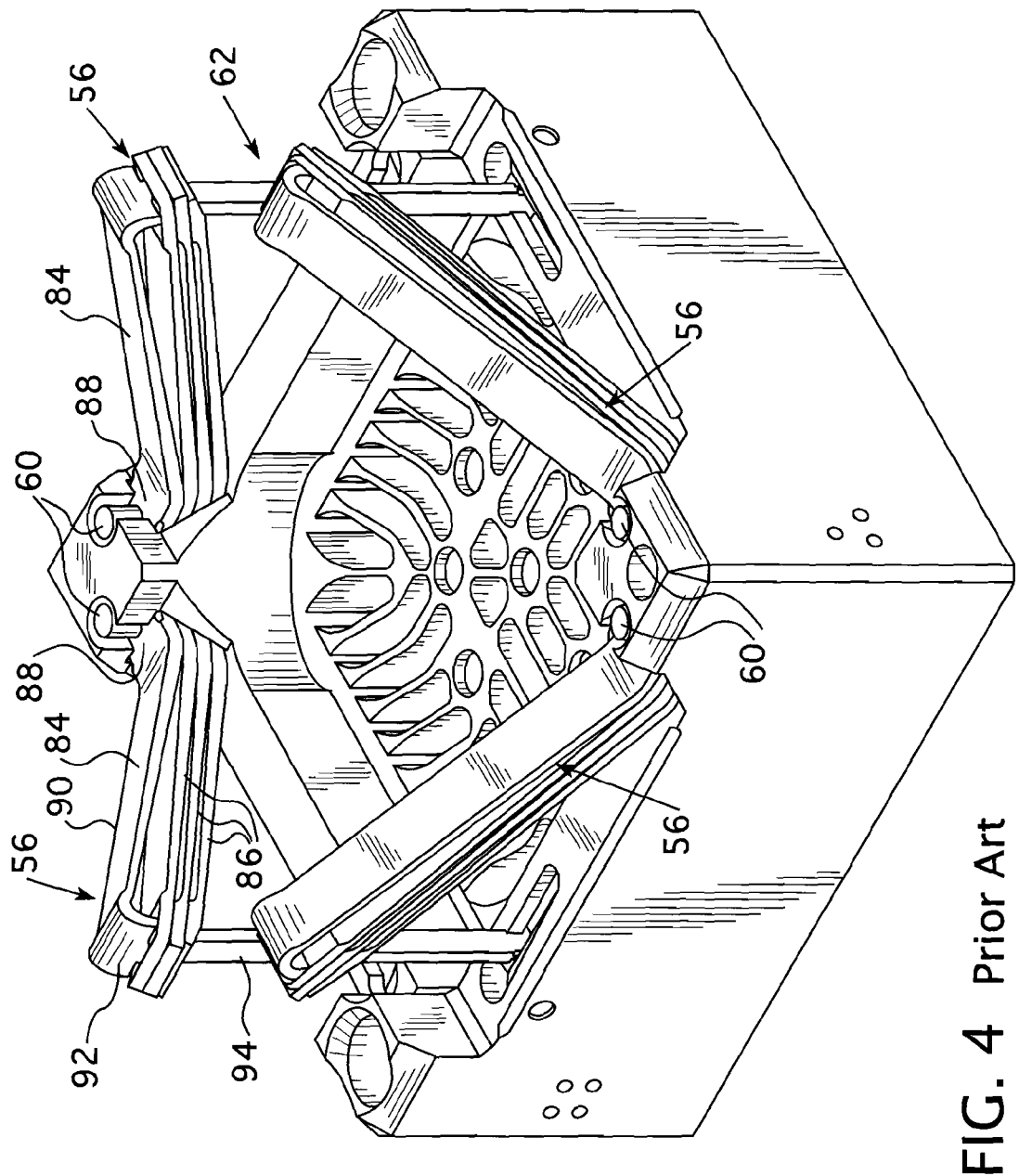
FIG. 4 is a perspective view of a prior art top fuel assembly nozzle showing four cantilevered leaf spring assemblies supported from diametrically opposite corners.

Conventional hold down springs 56 are mounted on the top fuel nozzles 62 and are retained by a pin 60 located at diametrically opposite corners of the top plate 20 as shown in FIG. 3. Typically, the top nozzle 62 supports four spring sets 56 as illustrated in FIG. 4. Each spring set has a primary spring 84 and at least one secondary spring 86 with two secondary springs being shown in FIG. 3 and three being shown in FIG. 4. In accordance with the prior art, spring leafs 84 and 86 have a flat, horizontal base 88 that is secured against the top plate 20 of the top nozzle 62 by a pin 60. The leafs then curve upward away from the top nozzle 20 with the primary spring member 84 having a first flat leg 90 that extends at an acute angle, greater than 0°, with the top plate 20 to an arcuate transition portion 92 at the other end of the first leg 90. A straight second leg portion 94 extends from the transition portion 92 toward the frame of the top nozzle 62 at an acute included angle with the first leg 90. The secondary spring leafs 86 of this prior art embodiment have a short flat section that corresponds to the flat spring base 88 of the primary spring and then curve upward under the primary spring, extending over a straight portion under the primary spring and terminating adjacent the transition portion 92 at a second end, with the second ends of the secondary leafs 86 interacting with the transition portion 92 of the primary spring 84 to resist downward movement of the transition portion 92 as the primary spring 84 deflects downward in a cantilevered fashion. The second leg 94 of the primary spring extends through an opening in the secondary spring leafs 86 to the top nozzle frame 62 where it interacts with a stop that is not shown.

Figure 1:
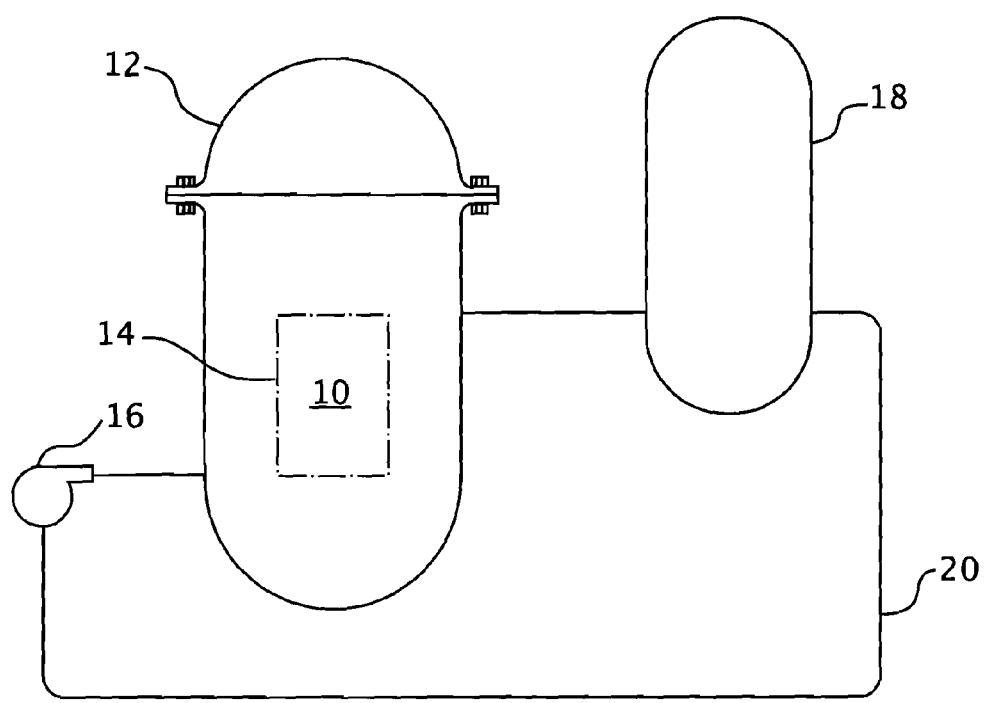
FIG. 1 is a simplified schematic of a nuclear reactor system to which this invention can be applied.
Figure 2:
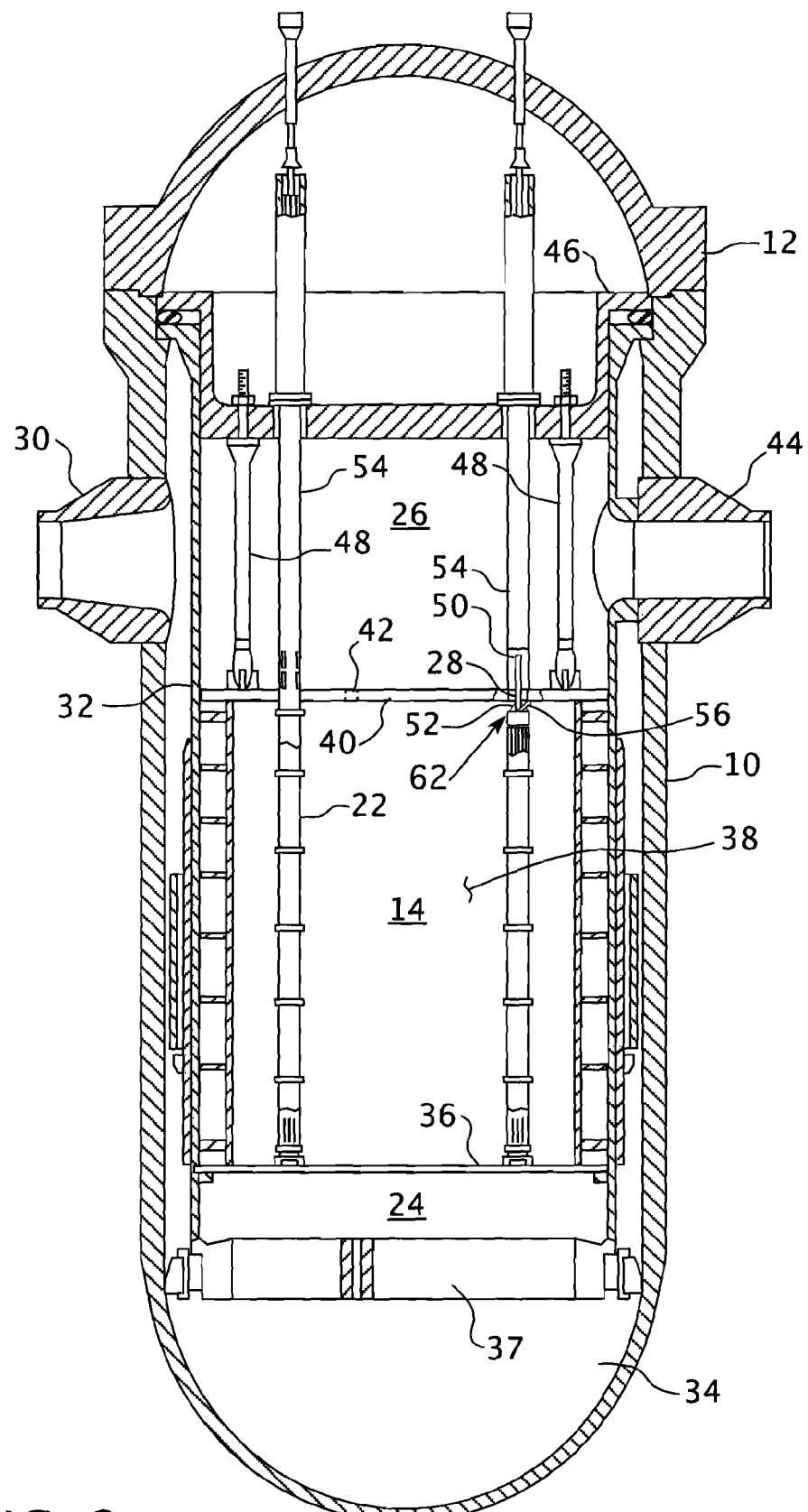
FIG. 2 is an elevational view, partially in section, of a nuclear reactor vessel and internals components to which this invention can be applied.

Fuel assemblies 22 are installed vertically in the reactor core 14 and stood upright on the lower core plate 60 (36). As can be appreciated from FIG. 2, after the fuel assemblies are set in place, the upper support structure 26 is installed. The upper core plate 40 then bears down against the hold down springs 56 on the top nozzle 62 of each fuel assembly 22 to hold the fuel assemblies in place. The springs are generally made of nickel-chromium-iron alloy 718. The retaining pin 60, which holds the spring set in place, can be either threaded into the top nozzle or welded to prevent loosening while in service.

Figure 5:
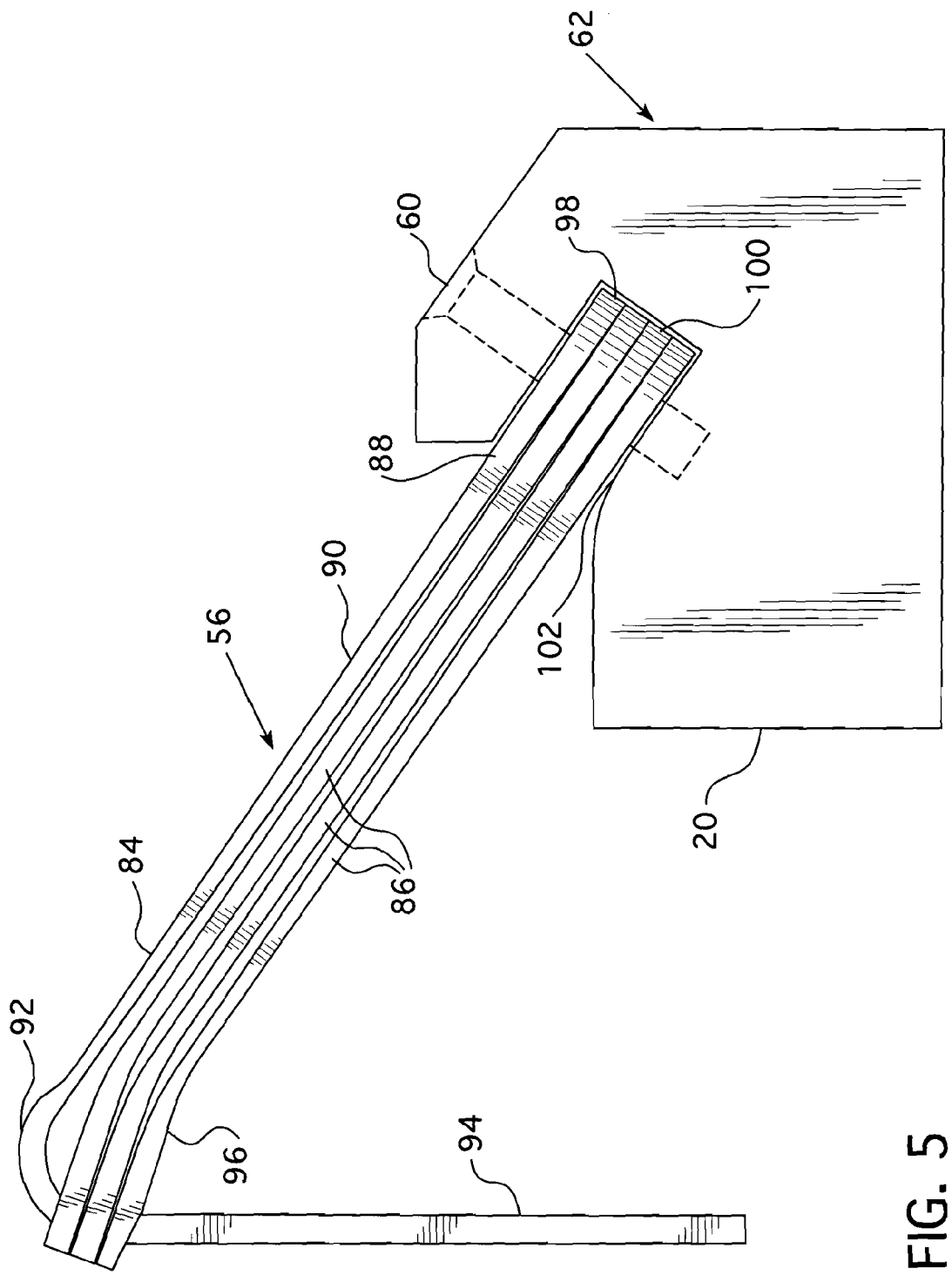
FIG. 5 is a schematic view of the fuel assembly top nozzle partially cut away to show the support of the cantilevered leaf spring assembly of this invention.
Figure 7:
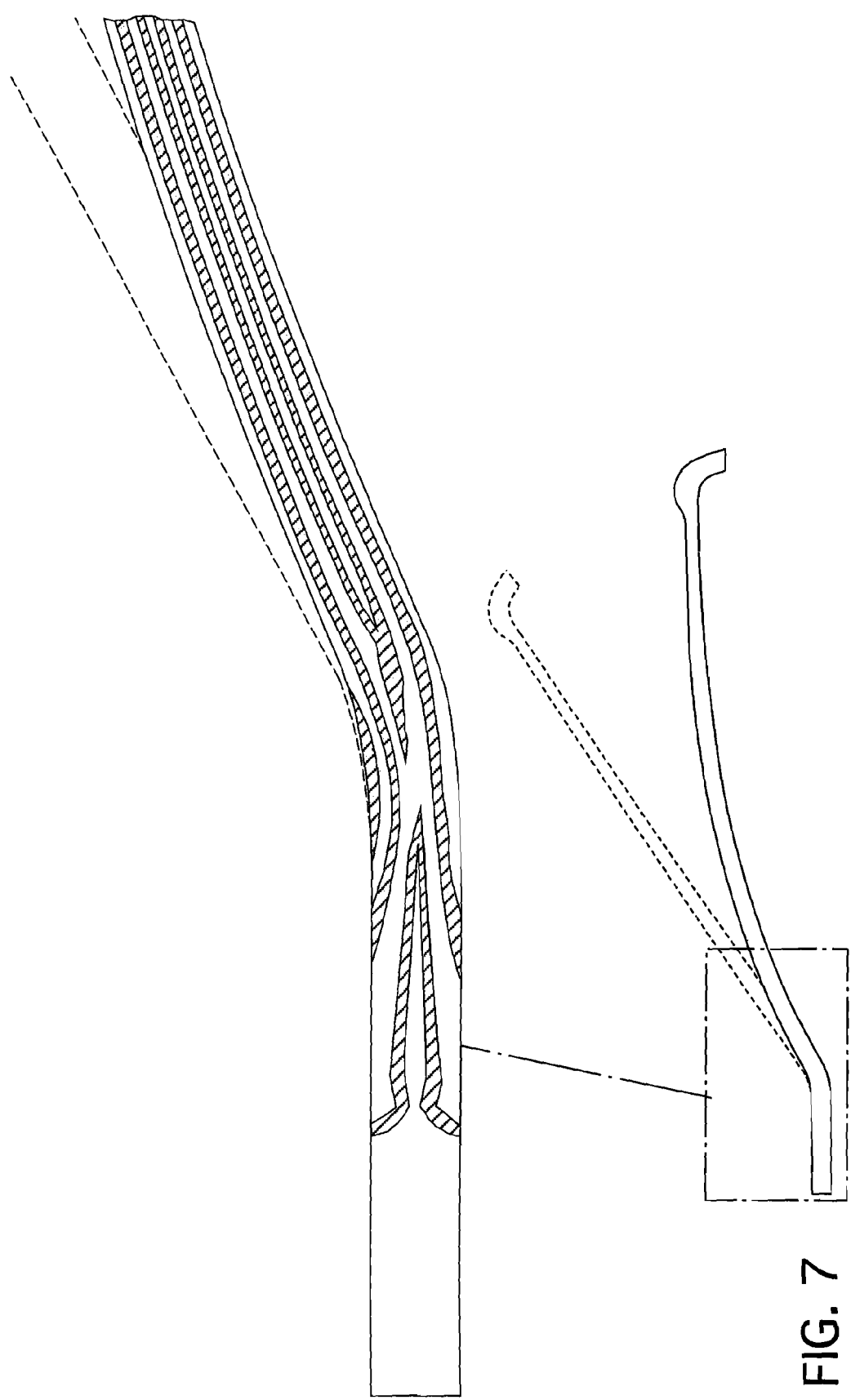
FIG. 7 is graphical representation of the strain distribution of the prior art leaf spring design.

The improvement of this invention is illustrated in FIG. 5. Like reference characters are used for corresponding components of the spring 56 and top nozzle 62, though it should be appreciated that the design of the individual components will deviate from the corresponding components of the prior art illustrated in FIGS. 3 and 4, as hereafter described. In accordance with this invention, the spring base 88 of each leaf, i.e., the primary spring members and secondary spring members, are formed from a short section of straight, flat beam followed by a long straight, flat beam 90 whose thickness is tapered, extending in a direction along the leafs away from the base 88. The beams 88 and 90 thus form one continuous flat leg. Other than the top primary spring 84, there is a slight bend 96 at the end portion of the straight secondary beams 86. Since the spring set 56 is a cantilevered structural system, the maximum bending moment and stretch occur at the support end 98. From the flexure loading of a straight beam, the absolute magnitude of strain or stress on the inner and outer fibers are equal. However, as for the curved base of a conventional spring design, the absolute magnitude of strain or stress on the inner and outer fibers are not equal due to a curvature effect which can be appreciated from the graphical representation of the strain distribution for the prior art leaf spring design shown in FIG. 7 and the strain distribution of the leaf spring design of this invention illustrated in FIG. 8. This analysis assumes an elastic-plastic deflection up to the operation condition. Based on the same loading analysis, the maximum absolute strain for the straight (flat) end spring design is equally distributed on the inner and outer fibers. The maximum strains are 0.014247 and 0.010104, respectively for the curved base of the prior art and the straight base design of this invention. This means the maximum strain is reduced by approximately 29% for the straight base design.

Figure 6:
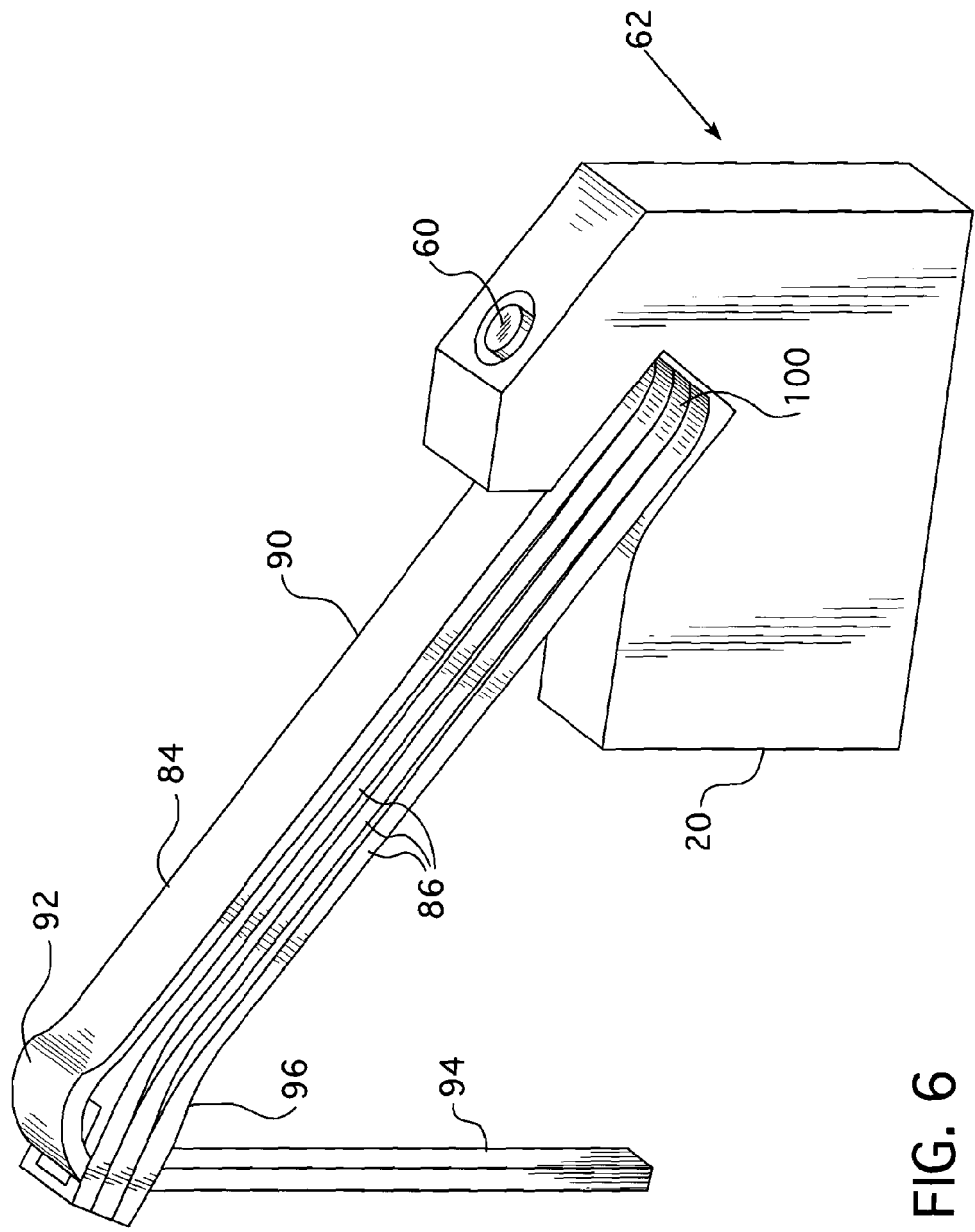
FIG. 6 is a perspective view of the spring assembly of this invention illustrated in FIG. 5, captured in a section of the top nozzle.

FIG. 6 provides another view of the spring design illustrated in FIG. 5 taken from another angle. The sections 88 and 90 shown in FIGS. 5 and 6 provide a straight, flat beam leaf spring set that extends from a slanted slot 100 in the top nozzle. The straight beams extend until the transition portion 92 in the primary spring leaf and the slightly curved sections 96 in the second end of the secondary spring leafs. The slanted slot 100 extends at an acute angle, greater than 0°, to a plane orthogonal to the longitudinal axis of the fuel assembly. The bends 96 are radiused at between 10° and 70°. Similarly, the lower lip 102 of the slot 100 is similarly radiused between 10° and 70°. In other respects, the top nozzle 62 is similar to that shown in FIG. 4.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly having a top end fitting and a bottom end fitting connected together by a structural assembly having an axial dimension that extends from the bottom end fitting to the top end fitting, the top end fitting having a spring assembly projecting above an upper surface of the top end fitting, the spring assembly comprising:

a primary spring member extending above the top end fitting, including a first straight leg portion extending from a point of attachment proximate one end of the primary spring member with the one end attached to a frame of the top end fitting at an acute angle to a plane orthogonal to the axial dimension, with the acute angle greater than zero degrees, an arcuate transition portion at the other end of the first leg, and a straight second leg portion extending from the transition portion toward the frame at an acute included angle with the first leg, the primary spring member being oriented on the top end fitting so that the transition portion is at the vertical highest elevation, whereby movement of the end fitting and an upper plate of a reactor that the nuclear fuel assembly is designed to operate in, relatively toward each other primarily loads the transition portion and deflects the first leg portion about the attachment to the top end fitting frame;

at least one secondary spring having a first and second end, the first end attached to the top end fitting adjacent the first end of the primary spring first leg, and the second end terminating adjacent the transition portion, and means at the second end of the secondary spring for interacting with the transition portion to resist downward movement of the transition portion as the primary spring member deflects in a cantilever fashion;

wherein the one end of the primary spring that is attached to the frame of the top end fitting is clamped on a first portion of a surface on the frame that extends substantially at the acute angle, a periphery of the first portion of the surface of the frame under the primary spring being radiused to transition to a second portion of the surface of the frame under the primary spring that extends substantially parallel to the plane orthogonal to the axial dimension; and wherein the at least one secondary spring has a substantially flat leg that extends from the first end to an intermediate portion near the second end where, in an undeflected state, the flat leg is radiused in the direction of the frame away from the primary spring so that the secondary spring substantially contacts an underside of the primary spring over more than a half of a length of the secondary spring and a gap exists between the primary spring and the secondary spring at the transition portion of the primary spring.

2. The nuclear fuel assembly of claim 1 wherein the one end of the primary spring that is attached to the frame of the top end fitting is supported in a slot in the frame that extends substantially at the acute angle.

3. The nuclear fuel assembly of claim 1 wherein the radiused intermediate portion is curved at between 10° and 70°.

4. The nuclear fuel assembly of claim 1 wherein the one end of the first straight leg portion of the primary spring member is attached to the frame of the top end fitting by a retaining pin or screw.

5. The nuclear fuel assembly of claim 1 wherein the periphery of the first portion of the surface of the frame under the primary spring that is radiused is curved at between 10° and 70°.

* * * * *